US010659207B2

(12) United States Patent
Wang et al.

(10) Patent No.: US 10,659,207 B2
(45) Date of Patent: May 19, 2020

(54) UPLINK POWER CONTROL IN NEW RADIO (NR)

(71) Applicant: QUALCOMM Incorporated, San Diego, CA (US)

(72) Inventors: Renqiu Wang, San Diego, CA (US); Yi Huang, San Diego, CA (US); Wanshi Chen, San Diego, CA (US); Peter Gaal, San Diego, CA (US); Seyong Park, San Diego, CA (US); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/979,008

(22) Filed: May 14, 2018

(65) Prior Publication Data

US 2018/0332542 A1    Nov. 15, 2018

Related U.S. Application Data

(60) Provisional application No. 62/506,410, filed on May 15, 2017.

(51) Int. Cl.
*H04L 5/00* (2006.01)
*H04W 52/34* (2009.01)
(Continued)

(52) U.S. Cl.
CPC .......... *H04L 5/0048* (2013.01); *H04L 5/0007* (2013.01); *H04L 5/0053* (2013.01);
(Continued)

(58) Field of Classification Search
CPC .. H04W 52/325; H04W 52/146; H04W 40/08
See application file for complete search history.

(56) References Cited

U.S. PATENT DOCUMENTS 8,908,793 B2   12/2014   Han et al.
2005/0195908 A1   9/2005   Dunn et al.
(Continued)

FOREIGN PATENT DOCUMENTS

EP         1067704 A2      1/2001

OTHER PUBLICATIONS

Ericsson: "On the Design of 2-Symbols PUCCH," 3GPP Draft; R1-1709082, 3rd Generation Partnership Project (3GPP), Mobile Competence Centre; 650, Route Des Lucioles; F-06921 Sophia-Antipolis Cedex; France, vol. RAN WG1, No. Hangzhou, China; May 15, 2017-May 19, 2017, May 14, 2017, XP051274240, 4 pages, Retrieved from the Internet: URL: http://www.3gpp.org/ftp/Meetings_3GPP_SYNC/RAN1/Docs/ [retrieved on May 14, 2017].
(Continued)

*Primary Examiner* — Keith Ferguson
(74) *Attorney, Agent, or Firm* — Arent Fox, LLP

(57) ABSTRACT

Aspects of the present disclosure implement techniques for power control management between the base station and the UE to support multiple waveforms and services. In one example, the power control management system may implement independent power control loops for each waveform and service (e.g., eMBB, uRLLC, etc.) supported by the wireless communication system. For example, the base station may transmit a first power control command to a UE for first waveform (e.g., CP-OFDM) or service (e.g., eMBB) and a second power control command to the UE for the second waveform (DFT-OFDM) or service (e.g., uRLLC). Features of the present disclosure may also implement techniques that allow the base station to transmit a single power control command for configuring the power control for a plurality of waveforms or services. Upon receiving the power control commands, the UE may configure the transmission power for uplink traffic based on the power control commands.

31 Claims, 4 Drawing Sheets

(51) Int. Cl.
  *H04W 52/28*  (2009.01)
  *H04W 52/14*  (2009.01)
  *H04W 52/24*  (2009.01)
  *H04W 52/32*  (2009.01)
  *H04W 52/36*  (2009.01)
  *H04W 72/04*  (2009.01)
  *H04W 52/06*  (2009.01)
  *H04W 52/42*  (2009.01)
  *H04W 52/26*  (2009.01)

(52) U.S. Cl.
  CPC ......... *H04L 5/0091* (2013.01); *H04W 52/146* (2013.01); *H04W 52/248* (2013.01); *H04W 52/281* (2013.01); *H04W 52/325* (2013.01); *H04W 52/346* (2013.01); *H04W 52/367* (2013.01); *H04L 5/001* (2013.01); *H04L 5/0012* (2013.01); *H04L 5/0023* (2013.01); *H04W 52/06* (2013.01); *H04W 52/243* (2013.01); *H04W 52/262* (2013.01); *H04W 52/42* (2013.01); *H04W 72/0413* (2013.01); *H04W 72/0446* (2013.01)

(56) References Cited

U.S. PATENT DOCUMENTS

| | | | |
|---|---|---|---|
| 2007/0115800 A1 | 5/2007 | Fonseka et al. | |
| 2009/0042530 A1 | 2/2009 | Wang et al. | |
| 2009/0185476 A1 | 7/2009 | Tsai et al. | |
| 2011/0292899 A1* | 12/2011 | Yu | H04W 52/265 370/329 |
| 2012/0039270 A1 | 2/2012 | Nguyen et al. | |
| 2012/0269138 A1 | 10/2012 | Han et al. | |
| 2013/0114505 A1 | 5/2013 | Haim et al. | |
| 2016/0278020 A1 | 9/2016 | Proctor, Jr. | |
| 2017/0223743 A1 | 8/2017 | Lin et al. | |
| 2017/0289928 A1* | 10/2017 | Wang | H04W 52/367 |
| 2017/0302479 A1 | 10/2017 | Mysore et al. | |
| 2018/0006779 A1 | 1/2018 | Yi et al. | |
| 2018/0054792 A1 | 2/2018 | Lee et al. | |
| 2018/0084593 A1 | 3/2018 | Chen et al. | |
| 2018/0152924 A1 | 5/2018 | Ouchi | |
| 2018/0279291 A1* | 9/2018 | Tiirola | H04L 1/1861 |
| 2018/0331803 A1 | 11/2018 | Wang et al. | |
| 2018/0331807 A1 | 11/2018 | Kim et al. | |
| 2018/0332539 A1* | 11/2018 | Fan | H04W 52/146 |
| 2019/0007175 A1 | 1/2019 | Kwak et al. | |
| 2019/0190751 A1 | 6/2019 | Nguyen et al. | |

OTHER PUBLICATIONS

Qualcomm Incorporated: "Channel Multiplexing for long PUCCH," 3GPP Draft; R1-1708619_Channel Multiplexing for Long PUCCH, 3rd Generation Partnership Project (3GPP), Mobile Competence Centre; 650, Route Des Lucioles; F-06921 Sophia-Antipolis Cedex; France, vol. RAN WG1, No. Hangzhou, CN; May 15, 2017-May 19, 2017, May 14, 2017, XP051273808, 8 pages, Retrieved from the Internet: URL: http://www.3gpp.org/ftp/Meetings_3GPP_SYNC/ RAN1/Docs/ [retrieved on May 14, 2017].

Qualcomm Incorporated: "Resource Allocation for PUCCH," 3GPP Draft; R1-1718806 Resource Allocation for PUCCH, 3rd Generation Partnership Project (3GPP), Mobile Competence Centre; 650, Route Des Lucioles; F-06921 Sophia-Antipolis Cedex; France, vol. RAN WG1, No. Prague, CZ; Oct. 9, 2017-Oct. 13, 2017, Oct. 8, 2017, XP051341951, 10 pages, Retrieved from the Internet: URL: http://www.3gpp.org/ftp/Meetings_3GPP_SYNC/RAN1/Docs/ [retrieved on Oct. 8, 2017].

CATT: "PUSCH Power Control in Multi-Beam Configuration", 3GPP Draft; R1-1707529 PUSCH_Power Control_Multi-Beam, 3rd Generation Partnership Project (3GPP), Mobile Competence Centre; 650, Route Des Lucioles; F-06921, Sophia-Antipolis Cedex; France, vol. RAN WG1, No. Hangzhou, China; May 15, 2017-May 19, 2017 May 14, 2017, XP051272737, Retrieved from the Internet: URL:http://www.3gpp.org/ftp/Meetings_3GPP_SYNC/RAN1/ Docs/ [retrieved on May 14, 2017], 7 pages.

International Search Report and Written Opinion—PCT/US2018/ 032738—ISA/EPO—dated Jul. 20, 2018.

* cited by examiner

UPLINK POWER CONTROL IN NEW RADIO (NR)

CROSS-REFERENCE TO RELATED APPLICATION(S)

This application claims benefit of U.S. Provisional Application No. 62/506,410, entitled "UPLINK POWER CONTROL IN NEW RADIO (NR)" filed May 15, 2017, which is expressly incorporated by reference herein in its entirety.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, 5G new radio (NR) communications technology is envisaged to expand and support diverse usage scenarios and applications with respect to current mobile network generations. Additionally, 5G NR communications technology may support multiple waveforms (e.g., cyclic prefix OFDM (CP-OFDM)) or discrete fourier transform-OFDM (DFT-OFDM) and multiple services (e.g., enhanced Mobile Broadband (eMBB) or ultra-reliable low latency communication (uRLLC) services).

By way of example, a wireless communication systems may include a number of base stations, each supporting communication for multiple pieces of user equipment (UEs). A base station may communicate with UEs on downlink channels (e.g., for transmissions from the base station to the UE) and uplink channels (e.g., for transmissions from the UEs to the base station). However, as the demand for mobile broadband access continues to increase, there exists a need for further improvements in 5G communications technology and beyond.

One such need is related to management of power controls for wireless communications between the base station and the user equipment (UE). Power control for signal transmission is an important feature of wireless communications systems because it may impact signal interference management, energy management, and connectivity management. The current systems, however, may not provide efficient power control management for different waveforms and different services as would be available for 5G NR communications technology.

SUMMARY

Aspects of the present disclosure implement techniques for power control management between the base station and the UE to support multiple waveforms and services. In one example, the power control management system may implement independent power control loops for each waveform and service (e.g., eMBB, uRLLC, etc.) supported by the wireless communication system. For example, the base station may transmit a first power control command to a UE for first waveform (e.g., CP-OFDM) or service (e.g., eMBB) and a second power control command to the UE for the second waveform (DFT-OFDM) or service (e.g., uRLLC). In other examples, features of the present disclosure may implement techniques that allow the base station to transmit a single power control command for configuring the power control for a plurality of waveforms or services. Upon receiving the power control commands, the UE may configure the transmission power for uplink traffic based on the power control commands.

In one example, a method for wireless communications is disclosed. The method may include establishing, at a base station, communication with a UE. The method may further include determining that the UE supports uplink communication over a plurality of services, and configuring power control parameters for at least one service from the plurality of services supported by the UE. The method may further include transmitting at least one power control command to the UE, wherein the at least one power control command is used by the UE to configure transmission power for the plurality of services for the uplink communication.

In another example, an apparatus for wireless communications is disclosed. The apparatus may include a memory configured to store instructions, and a processor communicatively coupled with the memory. The processor may be configured to execute the instructions to establish, at a base station, communication with a UE. The processor may further be configured to execute the instructions to determine that the UE supports uplink communication over a plurality of waveforms or services, and configuring power control parameters for at least one waveform or service from the plurality of waveforms or services supported by the UE. The processor may further be configured to execute the instructions to transmit at least one power control command to the UE, wherein the at least one power control command is used by the UE to configure transmission power for the plurality of waveforms or services for the uplink communication.

In another example, a computer readable medium for wireless communications is disclosed. The computer readable medium may include code for establishing, at a base station, communication with a UE. The computer readable medium may further include code for determining that the UE supports uplink communication over a plurality of waveforms or services, and configuring power control parameters for at least one waveform or service from the plurality of waveforms or services supported by the UE. The computer readable medium may further include code for transmitting at least one power control command to the UE, wherein the at least one power control command is used by the UE to configure transmission power for the plurality of waveforms or services for the uplink communication.

In another example, apparatus for wireless communications is disclosed. The apparatus may include means for establishing, at a base station, communication with a UE. The apparatus may further include means for determining that the UE supports uplink communication over a plurality of waveforms or services, and configuring power control parameters for at least one waveform or service from the plurality of waveforms or services supported by the UE. The apparatus may further include means for transmitting at least one power control command to the UE, wherein the at least one power control command is used by the UE to configure transmission power for the plurality of waveforms for the uplink communication.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
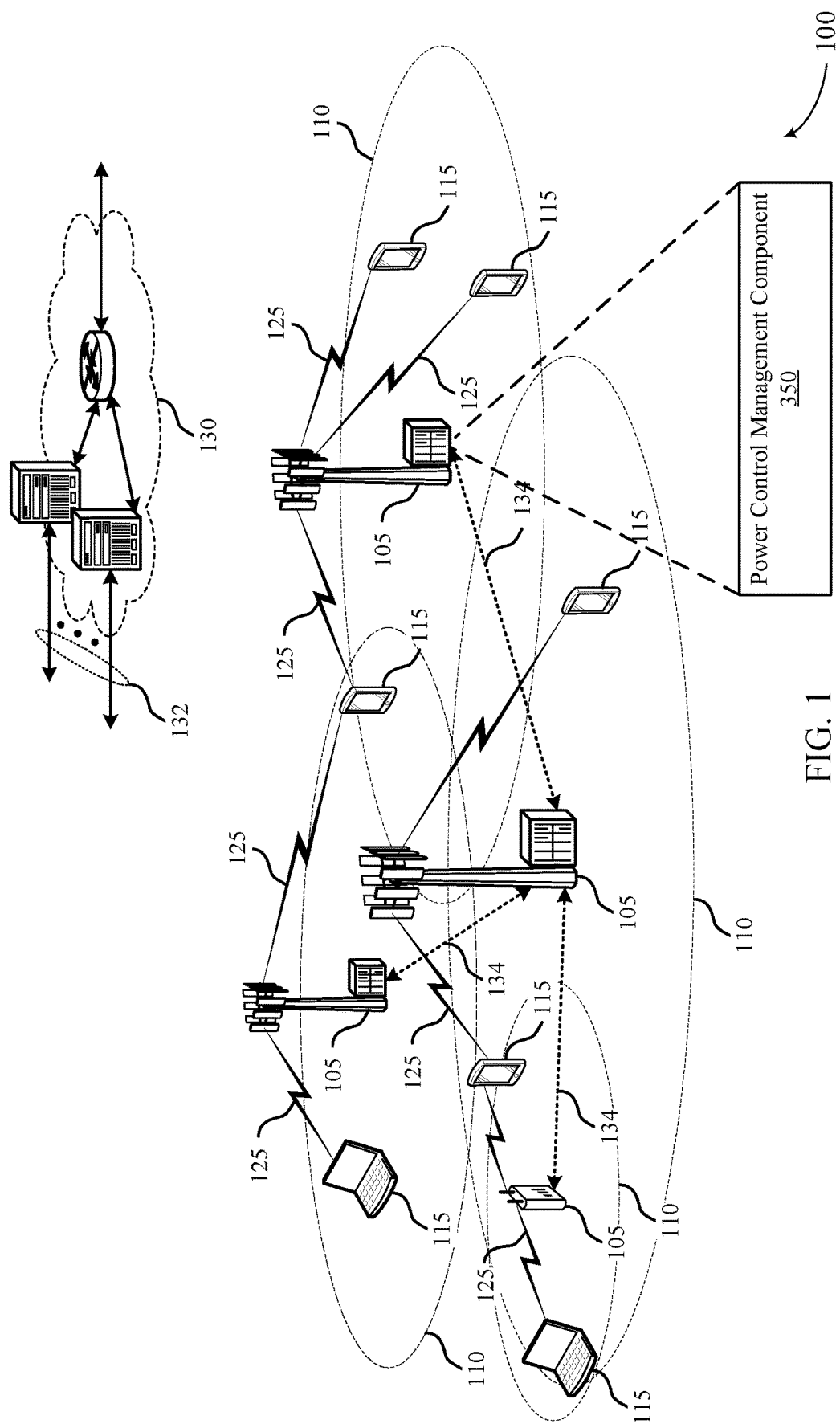
FIG. 1 illustrates an example of a wireless communications system in accordance with aspects of the present disclosure.

As discussed above, 5G NR communications may support various wireless communication services, such as Enhanced mobile broadband (eMBB) targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra-reliable low latency communications (URLLC). These services may include latency and reliability requirements. These services may also have different transmission time intervals (TTI) to meet respective quality of service (QoS) requirements. Additionally, 5G NR communications technology may support multiple waveforms (e.g., CP-OFDM, DFT-OFDM, etc.) for communications between the base station and the UE.

Current systems, however, may be ill-equipped to resolve power control issues that may arise for systems supporting plurality of waveforms and services. Indeed, power control for signal transmission is an important feature of wireless communications systems because it may impact signal interference management, energy management, and connectivity management.

Aspects of the present disclosure implement techniques for power control management between the base station and the UE to support multiple waveforms and services. Specifically, in some examples, the UE may be configured to utilize one or more waveforms for uplink communication with the base station. Accordingly, in such instances, the UE may dynamically transition between a first waveform (e.g., CP-OFDM) and the second waveform (e.g., DFT-OFDM) or vice versa. Power requirements for each waveform, however, may be different depending on the signal quality, the observed interference at the base station, etc. As such, it may not be sufficient to assign a single power control configuration for multiple waveforms supported by the UE. However, even in instances that the UE may support multiple waveforms, at any one time, only one active waveform may be employed by the UE. The active waveform may be switched between a first waveform and the second waveform based on considerations such as type of traffic, amount of traffic, uplink channel quality, etc. Thus, as the UE moves around the coverage area of the base station, the UE may transition between a plurality of waveforms for uplink communication.

In one example, features of the present disclosure may implement multiple independent power control loops between the base station and the UE such that the base station may transmit separate power control commands to the UE for each waveform (e.g., CP-OFDM, DFT-OFDM, etc.) and/or services (e.g., eMBB, URLLC, etc.) supported by the UE. In accordance with this example, the base station may transmit to the UE a first power control command associated with a first waveform for the UE and a second power control command associated with a second waveform for the UE. Upon receiving the respective first and second power command(s), the UE may configure the transmission power for uplink traffic based on a selection of an active waveform (e.g., first waveform or second waveform) in accordance with the parameters identified in the first and second power command(s). In some examples, the base station may continuously update the power control parameters for the one or more waveforms based on the strength of the received signal from the UE. When two independent power control loops are implemented for multiple waveforms, only the power control loop for the active waveform (e.g., the selected first waveform or second waveform) may be updated while the inactive waveform power control loop may be deactivated.

Similarly, for the plurality of services, the base station may transmit to the UE a first power control command associated with a first service (e.g., eMBB) for the UE and a second power control command associated with a second service (e.g., URLLC) for the UE. Upon receiving the respective first and second power command(s), the UE may configure the transmission power for uplink traffic based on a selection of the service (e.g., first service or second service) in accordance with the parameters identified in the first and second power command(s).

In another example, multiple power control loops for a plurality of waveforms and services may be correlated with a single power control command. In such instance, the base station may transmit a single power control command to the UE for one particular waveform (e.g., first waveform or second waveform) or service (e.g., first service or second service). Upon receiving the single power control command, the UE may calculate the transmission power (e.g., $P_{CP}$ for CP-OFDM waveform) to use for uplink traffic for the waveform and/or service for which the single power control command is associated with. Upon the calculation of the transmission power for the selected waveform (e.g., $P_{CP}$ for CP-OFDM waveform) or service, the UE may independently calculate the power for the second waveform (e.g., $P_{DFT}$ for DFT-OFDM waveform) or service based on a predetermined delta offset ($\Delta$) that may be maintained between the power for the plurality of waveforms (e.g., $P_{DFT}=P_{CP}+\Delta$).

Similarly, if the single power control command is associated with a DFT-OFDM waveform, the UE may calculate the transmission power (e.g., $P_{DFT}$ for DFT-OFDM waveform) to use for uplink traffic based on the single power control command 205. Upon calculating the transmission power of the first waveform (e.g., $P_{DFT}$ for DFT-OFDM waveform), the UE may independently calculate (e.g., without explicit command or instructions from the base station) the transmission power for the second waveform (e.g., $P_{CP}$ for CP-OFDM waveform) based on a predetermined delta offset ($\Delta$) that may be maintained between the power for the plurality of waveforms (e.g., $P_{CP}=P_{DFT}+\Delta$). In some examples, there may be a set of possible delta values (instead of a single offset value) that may be predetermined. In such instance, the base station may indicate, in a power control command, RRC configuration message, SIBs, etc., a selected delta value from the set of possible delta values upon which the UE may calculate the transmission power control for one or more second waveforms. Even further, in some examples, the delta offset value may be based on an offset function based on MCS, resource block allocation, SIMO/MIMO capabilities, narrow/wideband utilization, etc. In such instance, the mapping function may be predefined such that the offset value may be derived by both the base station and the UE.

In yet another example, the wireless communication network may implement power control techniques for a plurality of waveforms and services based on a defined maximum delta ($\Delta_{max}$) that may be maintained between the two independent power loops. Specifically, the base station may transmit one power control command to the UE for each waveform separately, and identify the waveform (e.g., the first waveform or the second waveform) that the power control command is associated with. In order to maintain power separation between the two waveforms, the UE may first update the transmission power of the waveform associated with the power control command, and then calculate the difference between the updated first waveform transmission power (e.g., $P_{DFT}$ for DFT-OFDM waveform) with the transmission power of the second waveform (e.g., $P_{CP}$ for CP-OFDM waveform). In other words, the UE, upon updating the transmission power of the first waveform (e.g., $P_{DFT}$ for DFT-OFDM waveform) may identify the power difference between the transmission power of the first waveform and the transmission power of the second waveform (e.g., $P\Delta=P_{DFT}-P_{CP}$).

If the transmission power difference (P$\Delta$) between the transmission power of the first waveform and the transmission power of the second waveform exceeds the predetermined maximum delta ($\Delta_{max}$) that may be maintained between the two independent power loops, the UE may further update the transmission power of the second waveform with the predetermined maximum delta ($\Delta_{max}$). For example, if the transmission power of the first waveform (e.g., $P_{CP}$ for CP-OFDM waveform) is updated and the power difference (P$\Delta$) between the transmission power of the first waveform and the transmission power of the second waveform (e.g., $P\Delta=P_{DFT}-P_{CP}$) exceeds the predetermined maximum delta ($\Delta_{max}$), then the UE may update the transmission power of the second waveform ($P_{DFT}$) to maximum delta (e.g., $P_{DFT}=P_{CP}+\Delta_{max}$).

In some examples, the maximum delta ($\Delta_{max}$) may be a set of values (as opposed to a single maximum delta), or a mapping function as discussed above. For example, features of the present disclosure may include one fixed maximum delta per resource block values scaled by number of resource blocks. In such situation, the maximum delta may be a function of resource blocks (e.g., $\Delta_{max}=\Delta_{max}$ per RB*number of RBs).

Various aspects are now described in more detail with reference to the FIGS. 1-4. In the following description, for purposes of explanation, numerous specific details are set forth in order to provide a thorough understanding of one or more aspects. It may be evident, however, that such aspect(s) may be practiced without these specific details. Additionally, the term "component" as used herein may be one of the parts that make up a system, may be hardware, firmware, and/or software stored on a computer-readable medium, and may be divided into other components.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Referring to FIG. 1, in accordance with various aspects of the present disclosure, an example wireless communication network 100 may include one or more base stations 105, one or more UEs 115, and a core network 130. The core network 130 may provide user authentication, access authorization, tracking, internet protocol (IP) connectivity, and other access, routing, or mobility functions. The base stations 105 may interface with the core network 130 through backhaul links 134 (e.g., S1, etc.). The base stations 105 may perform radio configuration and scheduling for communication with the UEs 115, or may operate under the control of a base station controller (not shown). In various examples, the base stations 105 may communicate, either directly or indirectly (e.g., through core network 130), with one another over backhaul links 134 (e.g., ×1, etc.), which may be wired or wireless communication links. In some examples, base station 105 may include a power control management component 350 to perform one or more techniques of the present disclosure. Components and sub-components of the power control management component 350 are described in detail with reference to FIG. 3.

The base stations 105 may wirelessly communicate with the UEs 115 via one or more base station antennas. Each of the base stations 105 may provide communication coverage for a respective geographic coverage area 110. In some examples, base stations 105 may be referred to as a base transceiver station, a radio base station, an access point, a radio transceiver, a NodeB, eNodeB (eNB), Home NodeB, a Home eNodeB, a relay, or some other suitable terminology. The geographic coverage area 110 for a base station 105 may be divided into sectors or cells making up only a portion of the coverage area (not shown). The wireless communication network 100 may include base stations 105 of different types (e.g., macro base stations or small cell base stations, described below). Additionally, the plurality of base stations 105 may operate according to different ones of a plurality of communication technologies (e.g., 5G, 4G/LTE, 3G, Wi-Fi, Bluetooth, etc.), and thus there may be overlapping geographic coverage areas 110 for different communication technologies.

In some examples, the wireless communication network 100 may be or include a Long Term Evolution (LTE) or LTE-Advanced (LTE-A) technology network. The wireless communication network 100 may also be a next generation technology network, such as a 5G wireless communication network. In LTE/LTE-A networks, the term evolved node B (eNB) may be generally used to describe the base stations 105, while the term UE may be generally used to describe the UEs 115. The wireless communication network 100 may be a heterogeneous LTE/LTE-A network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may generally cover a relatively large geographic area (e.g., several kilometers in radius) and may allow unrestricted access by the UEs 115 with service subscriptions with the network provider.

A small cell may include a relative lower transmit-powered base station, as compared with a macro cell, that may operate in the same or different frequency bands (e.g., licensed, unlicensed, etc.) as macro cells. Small cells may include pico cells, femto cells, and micro cells according to various examples. A pico cell, for example, may cover a small geographic area and may allow unrestricted access by the UEs 115 with service subscriptions with the network provider. A femto cell may also cover a small geographic area (e.g., a home) and may provide restricted access and/or unrestricted access by the UEs 115 having an association with the femto cell (e.g., in the restricted access case, the UEs 115 in a closed subscriber group (CSG) of the base station 105, which may include the UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The communication networks that may accommodate some of the various disclosed examples may be packet-based networks that operate according to a layered protocol stack and data in the user plane may be based on the IP. A radio link control (RLC) layer may perform packet segmentation and reassembly to communicate over logical channels. A MAC layer may perform priority handling and multiplexing of logical channels into transport channels. The MAC layer may also use HARQ to provide retransmission at the MAC layer to improve link efficiency. In the control plane, the radio resource control (RRC) protocol layer may provide establishment, configuration, and maintenance of an RRC connection between a UE 115 and the base stations 105. The RRC protocol layer may also be used for core network 130 support of radio bearers for the user plane data. At the physical (PHY) layer, the transport channels may be mapped to physical channels.

The UEs 115 may be dispersed throughout the wireless communication network 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, an entertainment device, a vehicular component, or any device capable of communicating in wireless communication network 100. Additionally, a UE 115 may be Internet of Things (IoT) and/or machine-to-machine (M2M) type of device, e.g., a low power, low data rate (relative to a wireless phone, for example) type of device, that may in some aspects communicate infrequently with wireless communication network 100 or other UEs. A UE 115 may be able to communicate with various types of base stations 105 and network equipment including macro eNBs, small cell eNBs, relay base stations, and the like.

A UE 115 may be configured to establish one or more wireless communication links 125 with one or more base stations 105. The wireless communication links 125 shown in wireless communication network 100 may carry uplink (UL) transmissions from a UE 115 to a base station 105, or downlink (DL) transmissions, from a base station 105 to a UE 115. The downlink transmissions may also be called forward link transmissions while the uplink transmissions may also be called reverse link transmissions. Each wireless communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. In an aspect, the communication links 125 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2). Moreover, in some aspects, the communication links 125 may represent one or more broadcast channels.

In some aspects of the wireless communication network 100, base stations 105 or UEs 115 may include multiple antennas for employing antenna diversity schemes to improve communication quality and reliability between base stations 105 and UEs 115. Additionally or alternatively, base stations 105 or UEs 115 may employ multiple input multiple output (MIMO) techniques that may take advantage of multi-path environments to transmit multiple spatial layers carrying the same or different coded data.

The wireless communication network 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

Figure 2:
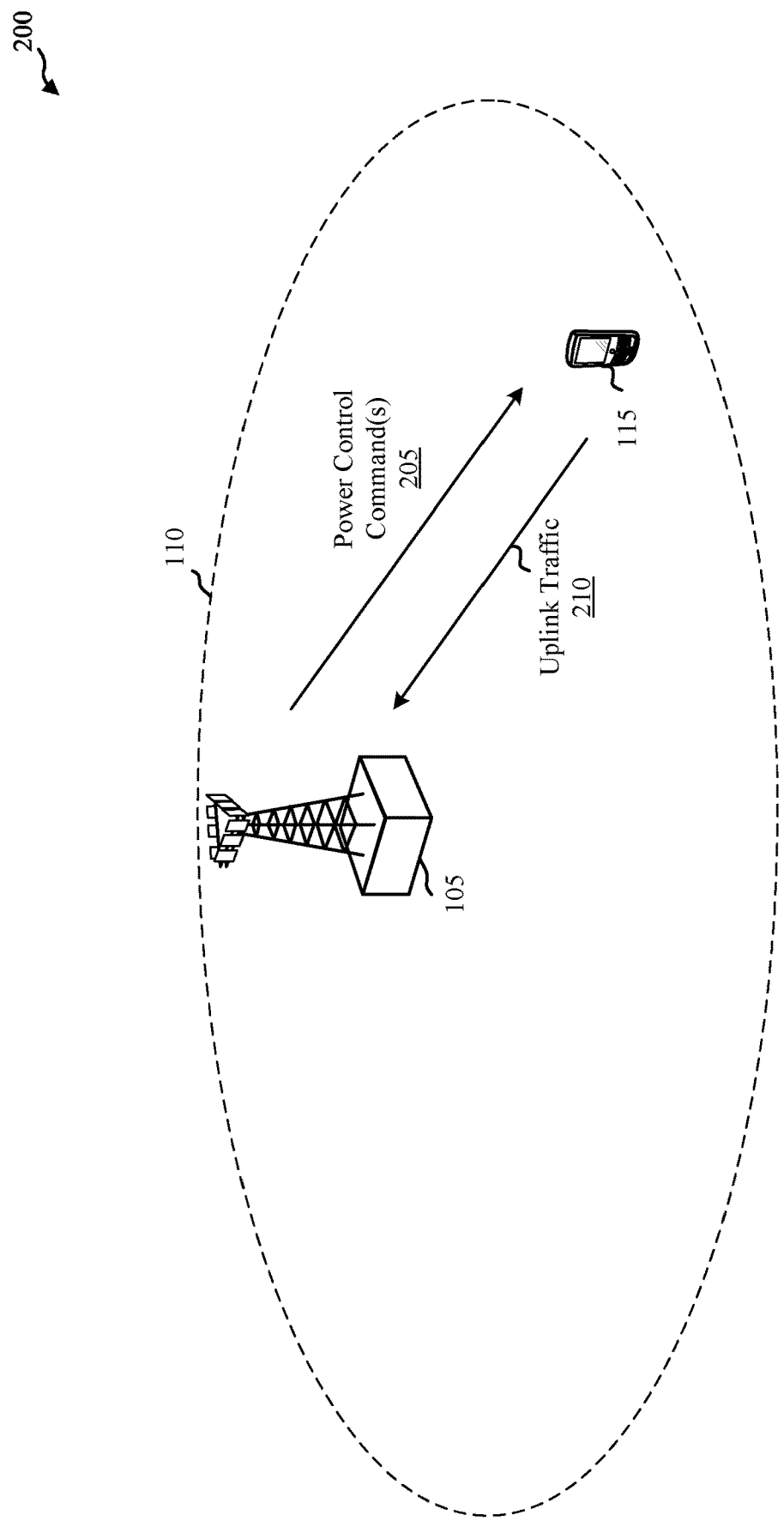
FIG. 2 is an example of a power control management system in accordance with aspects of the present disclosure.

FIG. 2 is an example of a wireless communication network 200 implementing the power control techniques of the present disclosure. In some examples, the wireless communication network 200 may be an example of the wireless communication network 100 described with reference to FIG. 1. Similarly, the base station 105 and UE 115 illustrated in FIG. 2 may be examples of the base stations 105 and UEs 115 described with reference to FIG. 1. It should be appreciated that although FIG. 2 illustrates a single base station 105 and single UE 115, the power control features of the present disclosure are not limited as such, but may be applicable to a plurality of base stations 105, access points, and UEs 115.

As noted above, a new air interface is being introduced for 5G, including features that include eMBB targeting wide bandwidth (e.g. 80 MHz beyond), mmW targeting high carrier frequency (e.g. 60 GHz), mMTC targeting non-backward compatible MTC techniques, and mission critical targeting URLLC. For these general topics, different techniques are considered, such as coding, low-density parity check (LDPC), and Polar codes. Additionally, 5G NR communications technology may support multiple waveforms (e.g., CP-OFDM, DFT-OFDM, etc.) for communications between the base station 105 and the UE 115.

Wireless standards, such as 5G, may include latency and reliability requirements. Latency in a network may refer to the amount of time required for a packet of data to get from one point in the network to another point in the network. For example, latency in the user plane may be defined based on the time required for a successful delivery of an application layer packet from a layer 2 or 3 medium access control (MAC) service data unit (SDU) ingress point to a layer 2 or 3 MAC SDU egress point through a radio interface. Reliability in a network may refer to a probability of successfully transmitting X number of bytes within 1 ms, where 1 ms is the time to deliver a small packet from a protocol layer 2 or 3 SDU ingress point to an egress point, at a certain channel quality.

URLLC may have tight reliability and latency requirements for both control and data channels. For example, URLLC may have a target block error rate (BLER) of around 10–5 or lower (e.g., 10–9) and a target latency of around 0.5 ms (or 1 ms).

In certain cases, eMBB communication services and URLLC communication services are scheduled at different TTIs to meet respective QoS requirements. However, while scheduled at different TTIs, eMBB and URLLC are multiplexed in the same time-frequency resource to achieve efficient resource utilization. In other cases, eMBB traffic and URLLC traffic may be scheduled at the same time. In this case, as eMBB and URLLC are multiplexed in the same time-frequency resources, eMBB traffic (e.g., resource elements) may be "punctured"/pre-empted to accommodate URLLC traffic, for example, since URLLC traffic (e.g., rank 1 traffic) takes priority over eMBB traffic (e.g., rank 4 traffic).

Because power control for signal transmission is an important feature of wireless communications systems as it may impact signal interference management, energy management, and connectivity management, aspects of the present disclosure implement techniques for power control management between the base station and the UE to support multiple waveforms and services. Specifically, in some examples, the UE 115 may be configured to utilize one or more waveforms and services (e.g., eMBB or URLLC) for uplink communication with the base station 105. Accordingly, in such instances, the UE 115 may dynamically transition between a first waveform (e.g., CP-OFDM) and the second waveform (e.g., DFT-OFDM) or vice versa, or the first service (e.g., eMBB) and second service (e.g., URLLC). Power requirements for each waveform and services, however, may be different depending on the signal quality, the observed interference at the base station, etc. As such, it may not be sufficient to assign a single power control configuration for multiple waveforms supported by the UE 115. However, even in instances that the UE 115 may support multiple waveforms and services, at any one time, only one active waveform and service may be employed by the UE 115. The active waveform may be switched between a first waveform and the second waveform for uplink communication based on considerations such as type of traffic, amount of traffic, uplink channel quality, etc. Thus, as the UE 115 moves around the coverage area 110 of the base station 105, the UE 115 may transition between a plurality of waveforms for uplink communication 210.

In one example, the power control management (executed by power control management component 350) may implement multiple independent power control loops between the base station 105 and the UE 115 such that the base station may transmit separate power control commands 205 to the UE for each waveform (e.g., CP-OFDM, DFT-OFDM, etc.) and/or services (e.g., eMBB, URLLC, etc.) supported by the UE 115. In accordance with this example, the base station 105 may transmit to the UE 115 a first power control command associated with a first waveform for the UE 115 and a second power control command associated with a second waveform for the UE 115. Upon receiving the respective first and second power command(s) 205, the UE 115 may configure the transmission power for uplink traffic 210 based on a selection of an active waveform (e.g., first waveform or second waveform) in accordance with the parameters identified in the first and second power command(s). In some examples, the base station 105 may continuously update the power control parameters for the one or more waveforms based on the strength of the received signal from the UE 115. When two independent power control loops are implemented for multiple waveforms, only the power control loop for the active waveform (e.g., the selected first waveform or second waveform) may be updated while the inactive waveform power control loop may be deactivated.

Similarly, for the plurality of services, the base station 105 may transmit to the UE 115 a first power control command associated with a first service (e.g., eMBB) for the UE 115 and a second power control command associated with a second service (e.g., URLLC) for the UE 115. Upon receiving the respective first and second power command(s) 205, the UE 115 may configure the transmission power for uplink traffic 210 based on a selection of the service (e.g., first service or second service) in accordance with the parameters identified in the first and second power command(s).

In another example, multiple power control loops for a plurality of waveforms and services may be correlated with a single power control command. In such instance, the base station 105 may transmit a single power control command 205 to the UE 115 for one particular waveform (e.g., first waveform or second waveform) or service (e.g., first service or second service). Upon receiving the single power control command 205, the UE 115 may calculate the transmission power (e.g., $P_{CP}$ for CP-OFDM waveform) to use for uplink traffic for the waveform and/or service for which the single power control command 205 is associated with. Upon the calculation of the transmission power for the selected waveform (e.g., $P_{CP}$ for CP-OFDM waveform) or service, the UE 115 may independently calculate the power for the second waveform (e.g., $P_{DFT}$ for DFT-OFDM waveform) or service based on a predetermined delta offset (Δ) that may be maintained between the power for the plurality of waveforms (e.g., $P_{DFT}=P_{CP}+\Delta$).

Similarly, if the single power control command 205 is associated with a DFT-OFDM waveform, the UE 115 may calculate the transmission power (e.g., $P_{DFT}$ for DFT-OFDM waveform) to use for uplink traffic 210 based on the single power control command 205. Upon calculating the transmission power of the first waveform (e.g., $P_{DFT}$ for DFT-OFDM waveform), the UE 115 may independently calculate (e.g., without explicit command or instructions from the base station 105) the transmission power for the second waveform (e.g., $P_{CP}$ for CP-OFDM waveform) based on a predetermined delta offset (Δ) that may be maintained between the power for the plurality of waveforms (e.g., $P_{CP}=P_{DFT}+\Delta$). In some examples, there may be a set of possible delta values (instead of a single offset value) that may be predetermined. In such instance, the base station 105 may indicate, in a power control command, RRC configuration message, SIBs, etc., a selected delta value from the set of possible delta values upon which the UE 115 may calculate the transmission power control for one or more second waveforms. Even further, in some examples, the delta offset value may be based on an offset function based on MCS, resource block allocation, SIMO/MIMO capabilities, narrow/wideband utilization, etc. In such instance, the mapping function may be predefined such that the offset value may be derived by both the base station 105 and the UE 115.

In yet another example, the wireless communication network 200 may implement power control techniques for a plurality of waveforms and services based on a defined maximum delta ($\Delta_{max}$) that may be maintained between the two independent power loops. Specifically, the base station 105 may transmit one power control command 205 to the UE 115 for each waveform separately, and identify the waveform (e.g., the first waveform or the second waveform) that the power control command is associated with. In order to maintain power separation between the two waveforms, the UE 115 may first update the transmission power of the waveform associated with the power control command, and then calculate the difference between the updated first waveform transmission power (e.g., $P_{DFT}$ for DFT-OFDM waveform) with the transmission power of the second waveform (e.g., $P_{CP}$ for CP-OFDM waveform). In other words, the UE 115, upon updating the transmission power of the first waveform (e.g., $P_{DFT}$ for DFT-OFDM waveform) may identify the power difference between the transmission power of the first waveform and the transmission power of the second waveform (e.g., $P\Delta=P_{DFT}-P_{CP}$).

If the transmission power difference ($P\Delta$) between the transmission power of the first waveform and the transmission power of the second waveform exceeds the predetermined maximum delta ($\Delta_{max}$) that may be maintained between the two independent power loops, the UE 115 may further update the transmission power of the second waveform with the predetermined maximum delta ($\Delta_{max}$). For example, if the transmission power of the first waveform (e.g., $P_{CP}$ for CP-OFDM waveform) is updated and the power difference ($P\Delta$) between the transmission power of the first waveform and the transmission power of the second waveform (e.g., $P\Delta=P_{DFT}-P_{CP}$) exceeds the predetermined maximum delta ($\Delta_{max}$), then the UE 115 may update the transmission power of the second waveform ($P_{DFT}$) to maximum delta (e.g., $P_{DFT}=P_{CP}+\Delta_{max}$).

In some examples, the maximum delta ($\Delta_{max}$) may be a set of values (as opposed to a single maximum delta), or a mapping function as discussed above. For example, features of the present disclosure may include one fixed maximum delta per resource block values scaled by number of resource blocks. In such situation, the maximum delta may be a function of resource blocks (e.g., $\Delta_{max}=\Delta_{max}$ per RB*number of RBs).

Figure 3:
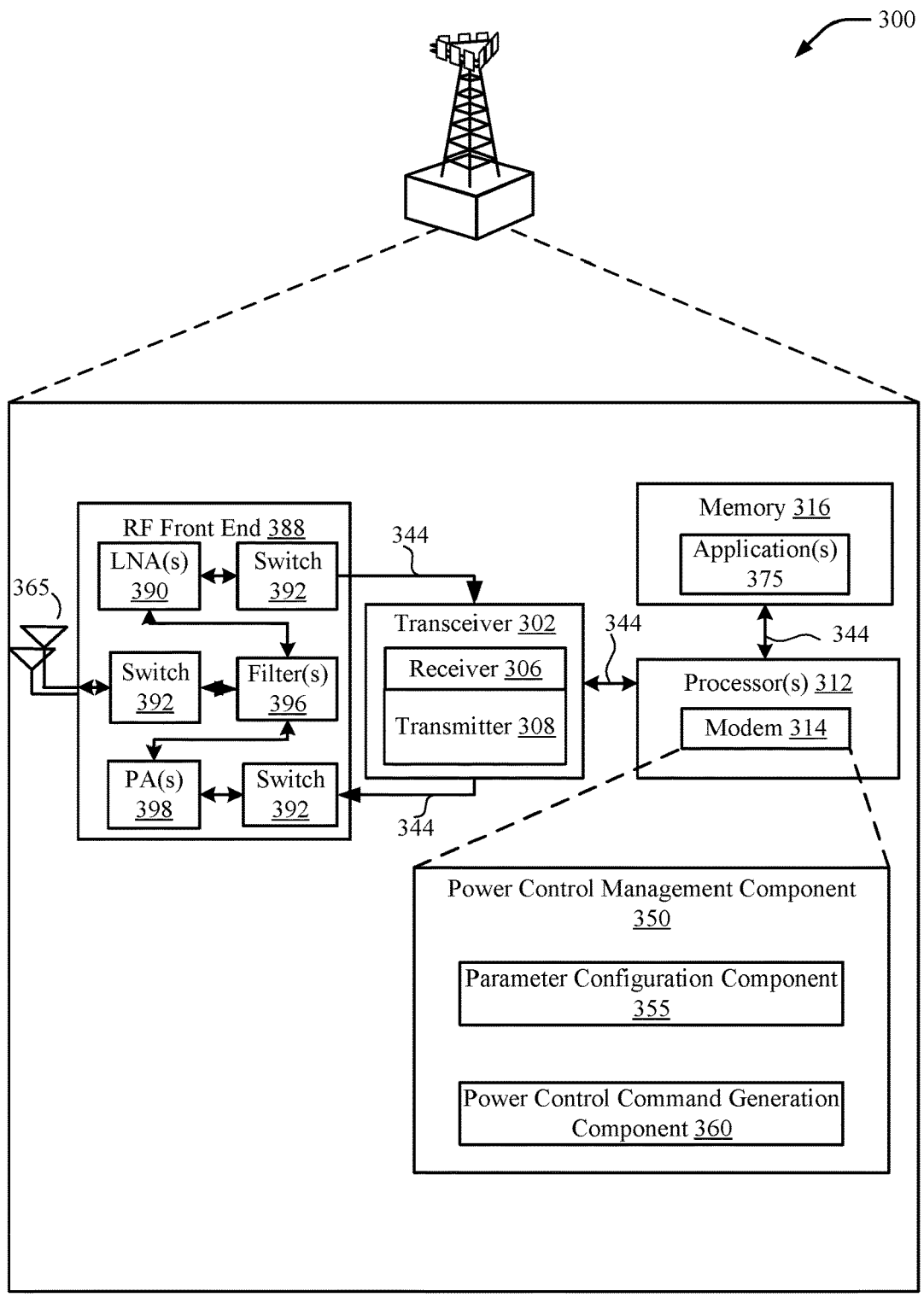
FIG. 3 illustrates an example of a schematic diagram of an aspect of an implementation of various components of a base station in accordance with various aspects of the present disclosure.

FIG. 3 describes hardware components and subcomponents of a base station for implementing one or more methods (e.g., method 400) described herein in accordance with various aspects of the present disclosure. For example, one example of an implementation of the transmitting device may include a variety of components, some of which have already been described above, but including components such as one or more processors 312 and memory 316 and transceiver 302 in communication via one or more buses 344, which may operate in conjunction with the power control management component 350 to enable signal generation that allows for one or more receiving device (e.g., UEs 115) to properly demodulate the received signal. In some examples, the power control management component 350 may be configured to perform functions described herein related to including one or more methods of the present disclosure.

Additionally or alternatively, the power control management component 350 may be configured to implement techniques for power control management between the base station and the UE to support multiple waveforms and services. In one example, the power control management system may implement independent power control loops for each waveform and service (e.g., eMBB, uRLLC, etc.) supported by the wireless communication system. The power control management component 350 may include parameter configuration component 355 to modify one or more power configuration parameters for the UE 115 for one or more waveforms and services. For example, the power control command generation component 360 may transmit a first power control command to a UE for first waveform (e.g., CP-OFDM) or service (e.g., eMBB) and a second power control command to the UE for the second waveform (DFT-OFDM) or service (e.g., uRLLC). In other examples, features of the present disclosure may implement techniques that allow the base station to transmit a single power control command for configuring the power control for a plurality of waveforms or services. Upon receiving the power control commands, the UE may configure the transmission power for uplink traffic based on the power control commands.

The one or more processors 312, modem 314, memory 316, transceiver 302, RF front end 388 and one or more antennas 365, may be configured to support voice and/or data calls (simultaneously or non-simultaneously) in one or more radio access technologies. In an aspect, the one or more processors 312 can include a modem 314 that uses one or more modem processors. The various functions related to power control management component 350 may be included in modem 314 and/or processors 312 and, in an aspect, can be executed by a single processor, while in other aspects, different ones of the functions may be executed by a combination of two or more different processors. For example, in an aspect, the one or more processors 312 may include any one or any combination of a modem processor, or a baseband processor, or a digital signal processor, or a transmit processor, or a receiver processor, or a transceiver processor associated with transceiver 302. In other aspects, some of the features of the one or more processors 312 and/or modem 314 associated with power control management component 350 may be performed by transceiver 302.

Also, memory 316 may be configured to store data used herein and/or local versions of applications 375 or power control management component 350 and/or one or more of its subcomponents being executed by at least one processor 312. Memory 316 can include any type of computer-readable medium usable by a computer or at least one processor 312, such as random access memory (RAM), read only memory (ROM), tapes, magnetic discs, optical discs, volatile memory, non-volatile memory, and any combination thereof. In an aspect, for example, memory 316 may be a non-transitory computer-readable storage medium that stores one or more computer-executable codes defining power control management component 350 and/or one or more of its subcomponents, and/or data associated therewith, when UE 115 is operating at least one processor 312 to execute power control management component 350 and/or one or more of its subcomponents.

Transceiver 302 may include at least one receiver 306 and at least one transmitter 308. Receiver 306 may include hardware, firmware, and/or software code executable by a processor for receiving data, the code comprising instructions and being stored in a memory (e.g., computer-readable medium). Receiver 306 may be, for example, a radio frequency (RF) receiver. In an aspect, receiver 306 may receive signals transmitted by at least one UE 115. Additionally, receiver 306 may process such received signals, and also may obtain measurements of the signals, such as, but not limited to, Ec/Io, SNR, RSRP, RSSI, etc. Transmitter 308 may include hardware, firmware, and/or software code executable by a processor for transmitting data, the code comprising instructions and being stored in a memory (e.g., computer-readable medium). A suitable example of transmitter 308 may including, but is not limited to, an RF transmitter.

Moreover, in an aspect, transmitting device may include RF front end 388, which may operate in communication with one or more antennas 365 and transceiver 302 for receiving and transmitting radio transmissions, for example, wireless communications transmitted by at least one base station 105 or wireless transmissions transmitted by UE 115. RF front end 388 may be connected to one or more antennas 365 and can include one or more low-noise amplifiers (LNAs) 390, one or more switches 392, one or more power amplifiers (PAs) 398, and one or more filters 396 for transmitting and receiving RF signals.

In an aspect, LNA 390 can amplify a received signal at a desired output level. In an aspect, each LNA 390 may have a specified minimum and maximum gain values. In an aspect, RF front end 388 may use one or more switches 392 to select a particular LNA 390 and its specified gain value based on a desired gain value for a particular application.

Further, for example, one or more PA(s) 398 may be used by RF front end 388 to amplify a signal for an RF output at a desired output power level. In an aspect, each PA 398 may have specified minimum and maximum gain values. In an aspect, RF front end 388 may use one or more switches 392 to select a particular PA 398 and its specified gain value based on a desired gain value for a particular application.

Also, for example, one or more filters 396 can be used by RF front end 388 to filter a received signal to obtain an input RF signal. Similarly, in an aspect, for example, a respective filter 396 can be used to filter an output from a respective PA 398 to produce an output signal for transmission. In an aspect, each filter 396 can be connected to a specific LNA 390 and/or PA 398. In an aspect, RF front end 388 can use one or more switches 392 to select a transmit or receive path using a specified filter 396, LNA 390, and/or PA 398, based on a configuration as specified by transceiver 302 and/or processor 612.

As such, transceiver 302 may be configured to transmit and receive wireless signals through one or more antennas 365 via RF front end 388. In an aspect, transceiver 302 may be tuned to operate at specified frequencies such that transmitting device can communicate with, for example, one or more base stations 105 or one or more cells associated with one or more base stations 105. In an aspect, for example, modem 314 can configure transceiver 302 to operate at a specified frequency and power level based on the configuration of the transmitting device and the communication protocol used by modem 314.

In an aspect, modem 314 can be a multiband-multimode modem, which can process digital data and communicate with transceiver 302 such that the digital data is sent and received using transceiver 302. In an aspect, modem 314 can be multiband and be configured to support multiple frequency bands for a specific communications protocol. In an aspect, modem 314 can be multimode and be configured to support multiple operating networks and communications protocols. In an aspect, modem 314 can control one or more components of transmitting device (e.g., RF front end 388, transceiver 302) to enable transmission and/or reception of signals from the network based on a specified modem configuration. In an aspect, the modem configuration can be based on the mode of the modem and the frequency band in use. In another aspect, the modem configuration can be based on UE configuration information associated with transmitting device as provided by the network during cell selection and/or cell reselection.

Figure 4:
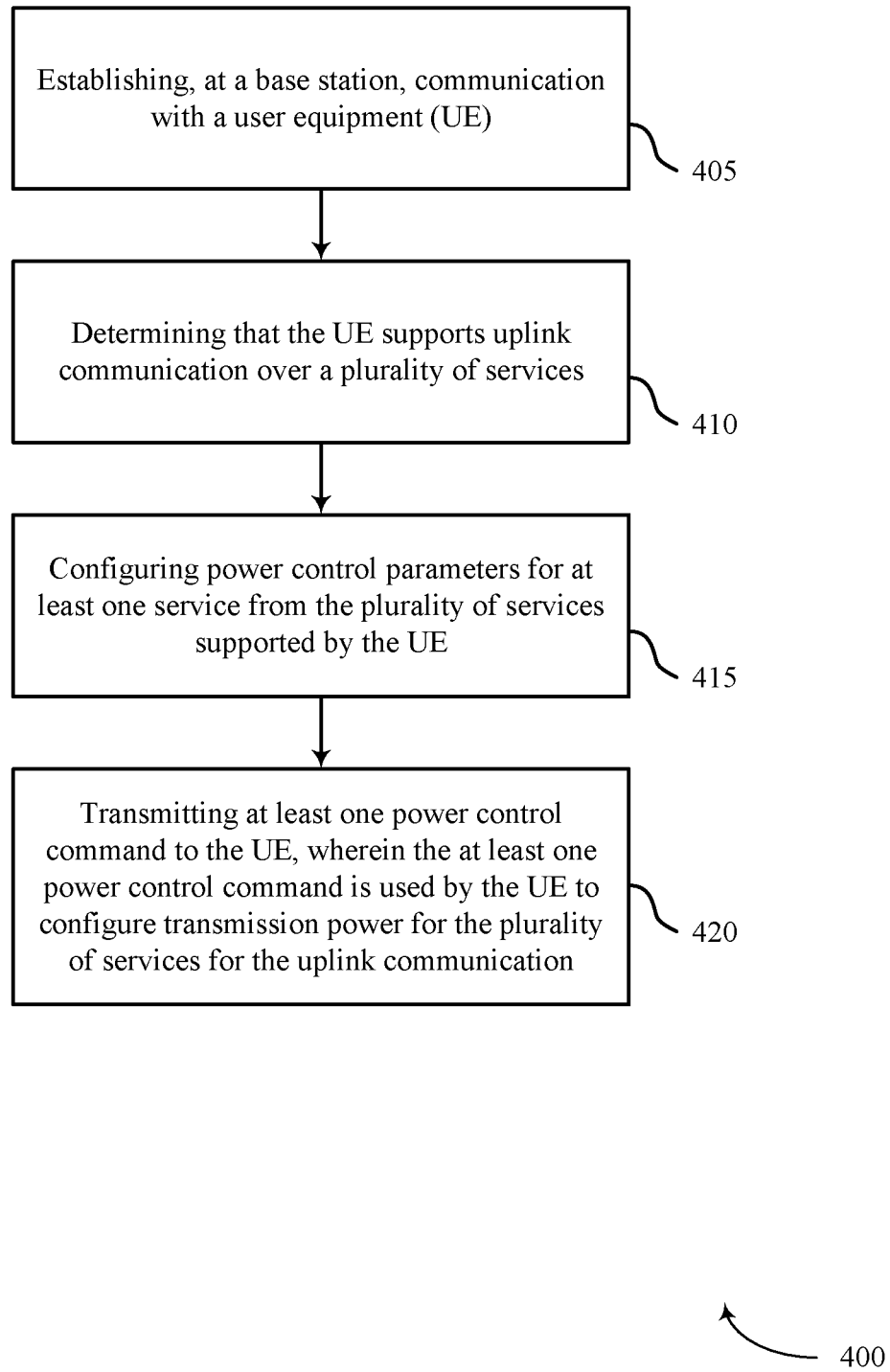
FIG. 4 illustrates an example of a method of wireless communication in accordance with aspects of the present disclosure

FIG. 4 is a flowchart of an example method 400 for transmitting subframes in wireless communications in accordance with aspects of the present disclosure. The method 400 may be performed using an apparatus (e.g., the base station 105). In some examples, the methods of the present disclosure may allow a receiving device (e.g., UE 115) to demodulate the received signal with improved channel estimation performance. Although the method 400 is described below with respect to the elements of the transmitting device (e.g., the base station 105), other components may be used to implement one or more of the steps described herein.

At block 405, the method may include establishing, at a base station, communication with UE. In some examples, the base station and UE may support communication over multiple waveforms for a plurality of services. Aspects of block 405 may be performed by power control management component 305 described with reference to FIG. 3.

At block 410, the method may include determining that the UE supports uplink communication over a plurality of services. In some aspects, the method may additionally or alternatively include determining that a wireless communication system (e.g., base station and the UE) supports multiple waveforms, and configuring the power control parameters for at least one waveform from the multiple waveforms supported by the UE. Aspects of block 410 may also be performed by power control management component 305 described with reference to FIG. 3.

At block 415, the method may configuring power control parameters for at least one service from the plurality of services supported by the UE. In some examples, configuring the power control parameters may include configuring a first power control parameters associated with a first service or waveform from the plurality of services and waveforms supported by the UE, and configuring a second power control parameters associated with a second service or waveform from the plurality of services and waveforms supported by the UE. In one or more examples, the configuration may be based on independent loops or by correlating power control parameters for the plurality of services and/or waveforms with a single power control command. Thus, in some examples, the method may include configuring a first power control parameters associated with a first service or waveform from the plurality of services or waveforms supported by the UE, wherein the first power control parameters is used by the UE to calculate a first transmission power for the first service or waveform and a second transmission power for the second service or waveform based at least in part on the first control parameter. The second transmission power for the second service or waveform may be calculated by applying a delta offset value to the first transmission power for the first service or waveform. In some examples, the delta offset value is derived by the base station based on an offset function of one or more of modulation coding scheme (MCS), resource block allocations, single input multiple output (SIMO) capabilities, or multiple input multiple output (MIMO) capabilities. Aspects of block 415 may also be performed by parameter configuration component 355 described with reference to FIG. 3.

At block 420, the method may include transmitting at least one power control command to the UE. The at least one power control command may be used by the UE to configure transmission power for the plurality of services or waveforms for the uplink communication. In some examples, where the transmission power is based on a single power control command and the delta offset value, the method may further include transmitting an indication of at least one delta offset value from a plurality of delta offset values, wherein the delta offset value is utilized by the UE to calculate transmission power for a second service or waveform from the plurality of services or waveforms based on receiving the at least one power control command associated with a first service or waveform from the plurality of services or waveforms. Aspects of block 415 may also be performed by transceiver 302 and power control command generation component 360 described with reference to FIG. 3.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

It should be noted that the techniques described above may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to 5G networks or other next generation communication systems).

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method for wireless communications, comprising:
   establishing, at a base station, communication with a user equipment (UE);
   determining that the UE supports uplink communication over a plurality of services;
   configuring power control parameters for at least one service from the plurality of services supported by the UE; and
   transmitting a single power control command to the UE for the UE to configure transmission power, based on the single power control command, for each of the plurality of services for the uplink communication.

2. The method of claim 1, wherein configuring the power control parameters for the at least one waveform from the plurality of services supported by the UE, comprises:
   configuring, based on a first power control loop, first power control parameters associated with a first service from the plurality of services supported by the UE; and
   configuring, based on a second power control loop, second power control parameters associated with a second service from the plurality of services supported by the UE,
   wherein the first power control loop is independent of the second power control loop.

3. The method of claim 1, wherein the plurality of services include at least one of enhanced Mobile Broadband (eMBB) or ultra-reliable low latency communication (uRLLC) services.

4. The method of claim 1, further comprising:
   determining that the UE supports uplink communication over a plurality of waveforms; and
   configuring the power control parameters for at least one waveform from the plurality of waveforms supported by the UE.

5. The method of claim 4, wherein configuring the power control parameters for the at least one waveform from the plurality of waveforms supported by the UE, comprises:
   correlating power control parameters for the plurality of waveforms with the single power control command.

6. The method of claim 4, wherein the plurality of waveforms include at least one of cyclic prefix orthogonal frequency division multiple access (CP-OFDM)) or discrete fourier transform orthogonal frequency division multiple access (DFT-OFDM) waveforms.

7. The method of claim 1, wherein configuring the power control parameters for the at least one service from the plurality of services supported by the UE, comprises:
   correlating power control parameters for the plurality of services with the single power control command.

8. The method of claim 1, wherein configuring the power control parameters for the at least one service from the plurality of service supported by the UE, comprises:
   configuring first power control parameters associated with a first service from the plurality of services supported by the UE,
   wherein the first power control parameters are used by the UE to calculate a first transmission power for the first service and a second transmission power for the second service based at least in part on the first control parameters.

9. The method of claim 8, wherein the second transmission power for the second service is calculated by applying a delta offset value to the first transmission power for the first service.

10. The method of claim 9, wherein the delta offset value is derived by the base station based on an offset function of one or more of modulation coding scheme (MCS), resource block allocations, single input multiple output (SIMO) capabilities, or multiple input multiple output (MIMO) capabilities.

11. The method of claim 1, further comprising:
    transmitting an indication of at least one delta offset value from a plurality of delta offset values for the UE to calculate transmission power for a second service from the plurality of services based on receiving the single power control command associated with a first service from the plurality of services.

12. An apparatus for wireless communications comprising:
    a memory configured to store instructions; and
    a processor communicatively coupled with the memory, wherein the processor is configured to execute the instructions to:
    establish, at a base station, communication with a user equipment (UE);
    determine that the UE supports uplink communication over a plurality of services;
    configure power control parameters for at least one service from the plurality of services supported by the UE; and
    transmit a single power control command to the UE for the UE to configure transmission power, based on the single power control command, for each of the plurality of services for the uplink communication.

13. The apparatus of claim 12, wherein the instructions to configure the power control parameters for the at least one waveform from the plurality of services supported by the UE, further comprises instructions to:
    configure, based on a first power control loop, first power control parameters associated with a first service from the plurality of services supported by the UE; and configure, based on a second power control loop, second power control parameters associated with a second service from the plurality of services supported by the UE, wherein the first power control loop is independent of the second power control loop.

14. The apparatus of claim 12, wherein the instructions are further executable to:

determine that the UE supports uplink communication over a plurality of waveforms; and configure the power control parameters for at least one waveform from the plurality of waveforms supported by the UE.

15. The apparatus of claim 14, wherein the instructions to configure the power control parameters for the at least one waveform from the plurality of waveforms supported by the UE further include instructions to:

correlate power control parameters for the plurality of waveforms with the single power control command.

16. The apparatus of claim 13, wherein the plurality of waveforms include at least one of cyclic prefix orthogonal frequency division multiple access (CP-OFDM)) or discrete fourier transform orthogonal frequency division multiple access (DFT-OFDM) waveforms.

17. The apparatus of claim 12, wherein the instructions to configure the power control parameters for the at least one service from the plurality of services supported by the UE are further executable to:

correlate power control parameters for the plurality of services with the single power control command.

18. The apparatus of claim 12, wherein the instructions to configure the power control parameters for the at least one service from the plurality of services supported by the UE are further executable to:

configure first power control parameters associated with a first service from the plurality of services supported by the UE, wherein the first power control parameters are used by the UE to calculate a first transmission power for the first service and a second transmission power for the second service based at least in part on the first control parameters.

19. The apparatus of claim 18, wherein the second transmission power for the second service is calculated by applying a delta offset value to the first transmission power for the first service.

20. The apparatus of claim 19, wherein the delta offset value is derived by the base station based on an offset function of one or more of modulation coding scheme (MCS), resource block allocations, single input multiple output (SIMO) capabilities, or multiple input multiple output (MIMO) capabilities.

21. The apparatus of claim 12, wherein the instructions are further executable by the processor to:

transmit an indication of at least one delta offset value from a plurality of delta offset values for the UE to calculate transmission power for a second service from the plurality of services based on receiving the single power control command associated with a first service from the plurality of services.

22. The apparatus of claim 12, wherein the plurality of services include enhanced Mobile Broadband (eMBB) or ultra-reliable low latency communication (uRLLC) services.

23. A non-transitory computer readable medium for wireless communications, comprising code for:

establishing, at a base station, communication with a user equipment (UE);

determining that the UE supports uplink communication over a plurality of services;

configuring power control parameters for at least one service from the plurality of services supported by the UE; and transmitting a single power control command to the UE for the UE to configure transmission power, based on the single power control command, for each of the plurality of services for the uplink communication.

24. The non-transitory computer readable medium of claim 23, wherein the code for configuring the power control parameters for the at least one waveform from the plurality of services supported by the UE, further comprises code for:

configuring, based on a first power control loop, first power control parameters associated with a first service from the plurality of services supported by the UE; and configuring, based on a second power control loop, second power control parameters associated with a second service from the plurality of services supported by the UE, wherein the first power control loop is independent of the second control power loop.

25. The non-transitory computer readable medium of claim 23, further comprising code for:

determining that the UE supports uplink communication over a plurality of waveforms; and configuring the power control parameters for at least one waveform from the plurality of waveforms supported by the UE.

26. The non-transitory computer readable medium of claim 25, wherein the code for configuring the power control parameters for the at least one waveform from the plurality of waveforms supported by the UE, further comprises code for:

correlating power control parameters for the plurality of waveforms with the single power control command.

27. The non-transitory computer readable medium of claim 25, wherein the plurality of waveforms include at least one of cyclic prefix orthogonal frequency division multiple access (CP-OFDM)) or discrete fourier transform orthogonal frequency division multiple access (DFT-OFDM) waveforms.

28. The non-transitory computer readable medium of claim 23, wherein the code for configuring the power control parameters for the at least one service from the plurality of services supported by the UE, further comprises code for:

correlating power control parameters for the plurality of services with the single power control command.

29. The non-transitory computer readable medium of claim 23, wherein the code for configuring the power control parameters for the at least one service from the plurality of service supported by the UE, further comprises code for:

configuring first power control parameters associated with a first service from the plurality of services supported by the UE, wherein the first power control parameters are used by the UE to calculate a first transmission power for the first service and a second transmission power for the second service based at least in part on the first control parameters.

30. An apparatus for wireless communications, comprising:

means for establishing, at a base station, communication with a user equipment (UE);

means for determining that the UE supports uplink communication over a plurality of services;

means for configuring power control parameters for at least one service from the plurality of services supported by the UE; and means for transmitting a single power control command to the UE for the UE to configure transmission power, based on the single power control command, for each of the plurality of services for the uplink communication.

31. A user equipment (UE) for wireless communications comprising:
   a memory configured to store instructions; and
   a processor communicatively coupled with the memory, wherein the processor is configured to execute the instructions to:
   establish communication with a base station;
   receive, from the base station, a single power control command; and
   calculate, in response to receiving the single power control command, transmission power for each of a plurality of services for uplink communications based on the single power control command.

* * * * *